May 10, 1960  R. R. GOINS  2,936,303
OLEFIN POLYMERIZATION
Filed April 25, 1958
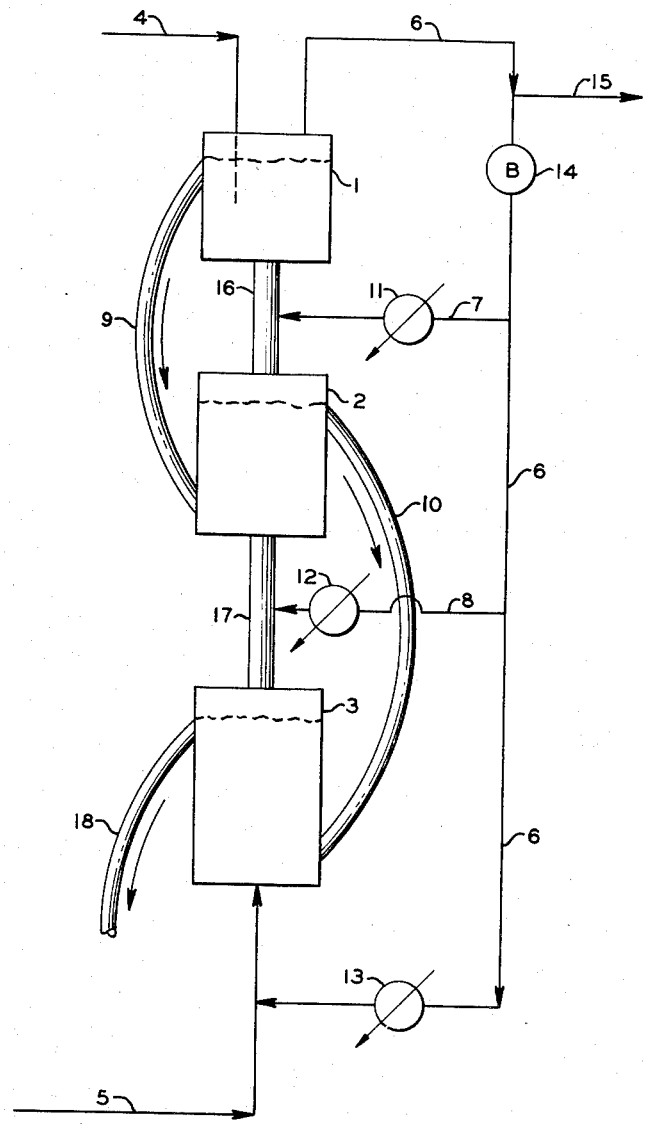
INVENTOR.
R.R. GOINS
BY Hudson & Young
ATTORNEYS

2,936,303
OLEFIN POLYMERIZATION

Robert R. Goins, Bartlesville, Okla., assignor to Phillips Petroleum Company, a corporation of Delaware Application April 25, 1958, Serial No. 730,940

4 Claims. (Cl. 260—93.7)

This invention relates to a process for the vapor phase polymerization of certain olefins to solid polymers. In a more specific aspect the invention relates to a method for polymerization of certain olefins using a countercurrent fluidized solids technique and an improved method of temperature control.

It is known that certain olefins such as ethylene, propylene and 1-butene can be polymerized to solids having molecular weights of more than 20,000 in the vapor phase employing various solid form catalysts. An advantageous technique has been found to employ finely divided solid catalysts in a dense bed of fluidized solids in a state of hindered settling and to pass a gas containing the olefin to be polymerized through said bed. The gases agitate the solids and thus keep them in a state of turbulent motion which promotes intimate contact of the olefin with the solid particles containing catalyst. These solid particles are catalyst particles containing solid olefin polymer since the polymerization is effected on the catalyst surface. Very high rates of polymerization and very high productivities are obtained by such a technique.

In a fluidized bed polymerization system, however, countercurrent flow of feed gases and catalyst-containing particles cannot be obtained within a single bed, since rapid random mixing of the solids, simulating a boiling liquid, is a characteristic of a dense fluidized bed. Therefore, maximum catalyst efficiency, which is obtainable in countercurrent operation, is not realized in fluidized solids polymerization in a single bed.

A very important factor in fluidized solids polymerization is control of temperature and removal of the large quantities of exothermic heat of reaction, because the quality and molecular weight of the polymer is affected by the polymerization temperature and the uniformity of the polymer is affected by the uniformity of temperature employed throughout the reaction.

It is an object of the invention to provide an improved method for the vapor phase polymerization of olefins to solid polymers employing a countercurrent fluidized solids reaction system. It is another object to provide an improved method for temperature control in such a reaction system.

Other objects as well as aspects and advantages of the invention, will become apparent from a study of the accompanying disclosure.

According to the invention there is provided a process for continuously polymerizing at least one of ethylene and propylene in admixture with an inert diluent gas comprising passing catalyst downwardly in finely divided solid form through a series of fluidized bed reaction zones countercurrently to a stream containing at least one of ethylene and propylene and also containing inert gases, thereby producing particle form solid polyolefin in each fluidized bed reaction zone, and controlling reaction temperatures in each reaction zone by cooling and recirculating portions of the off-gas from the last reaction zone to each of the said reaction zones.

Any solid finely divided catalyst that catalyzes the reaction of the olefins to solid polymers is applicable in the invention. Of particular practical importance are catalysts comprising chromium oxide, including a substantial amount of hexavalent chromium, associated with at least one other porous solid, especially an oxide selected from the group consisting of silica, alumina, zirconia and thoria. The catalysts of this description which are disclosed in U.S. Patent 2,825,721, issued March 4, 1958, are especially useful. Methods of preparing these catalysts are fully set forth in said application. The preferred chromium content of the chromium oxide catalyst is in the range 0.1 to 10 weight percent, and it is further preferred that at least 0.1 weight percent of the catalyst be chromium in the hexavalent state.

The chromium oxide catalyst can be prepared by impregnation of particulate silica, alumina, or silica-alumina, for example, with a solution of chromium oxide or a compound convertible to the oxide by calcination, followed by drying and activation of the composite at a temperature in the range of 450 to 1500° F. for a period of 3 to 10 hours or more. Activation is conducted by heating in a stream of gas. It is preferred that the gas contain oxygen and be substantially water-free. However, inert gases, such as carbon dioxide and nitrogen, can be used. It is found that within this activation range of temperature treatment of the catalyst, the character of the polymer can be controlled. The catalyst can be prepared using, as starting material, chrominum trioxide, chromic nitrate, chromic acetate, chromic chloride, chromic sulfate, ammonium chromate, ammonium dichromate, or other soluble salts of chromium. Impregnation with chromium trioxide ($CrO_3$) is preferred, although chromic nitrate can be used with similar results. It is believed that the catalyst prepared from the chloride and that prepared from the sulfate are at least partially converted to oxide during activation. The amount of chromium, as chromium oxide, in the catalyst can range from 0.1 to 20 or more weight percent. Chromium contents as high as 50 weight percent are operative, but amounts above 20 weight percent appear to have little added advantage. A preferred non-chromium component or "support" is a silica-alumina composite containing a major proportion of silica and a minor proportion of alumina. While the method of preparing the silica-alumina composite undoubtedly affects the catalyst activity to some extent, it appears that silica-alumina composites prepared by any of the prior art processes for preparing such catalytically active composites are operative for the process of this invention. Coprecipitation and impregnation are examples of such processes. One support that has been found particularly effective is a coprecipitated 90 percent silica–10 percent alumina support.

The polymerization of the invention is preferably effected in the temperature range from 150 to 310° F., and is effected below the melting point of the polymer being produced.

Polyethylene produced in the presence of a chromium oxide catalyst of the type described generally have melting points in the range of about 240 to 260° F., and it is desirable that the polymerization temperature be maintained below the melting point of the polymer in order to prevent agglomeration of the individual catalyst particles and to minimize the sticking of the polymer coated catalyst particles to the walls of the polymerization vessels. The minimum reaction temperature is ordinarily about 150° F. Polymerization temperature employed in my process is ordinarily in the range of 150 to 250° F., and a preferred temperature range is 200 to 240° F. A preferred pressure range is from atmospheric to 500 p.s.i.a., although higher or lower pressure can be used, especially up to about 1000 p.s.i.a.

Polypropylenes produced in accordance with the invention generally have melting points in the range of 230 to 320° F. In the process of the invention when polymerizing propylene the polymerization temperature is kept in the range from about 150 to 310° F., usually at least 200° F. for best results, and below the melting point of the polymer being produced. Pressures in the range from atmospheric to 1000 p.s.i.a., preferably from atmospheric to about 700 p.s.i.a., are generally used. Higher or lower pressures are also applicable.

Materials preferably produced according to the invention include not only homopolymers of ethylene or propylene, but also copolymers of ethylene with propylene and copolymers of ethylene or propylene with up to 10 weight percent 1-butene.

The drawing is a diagrammatic representation of a countercurrent stagewise fluidized polymerization according to a process of the invention.

Referring to the drawing, polymerization zones 1, 2 and 3 each contains dense fluidized beds of finely divided solid polymer particles formed in the polymerization process containing finely divided solid catalysts. The monomer feed, such as ethylene or propylene in admixture with inert gases such as methane, ethane, propane or the like is introduced into lower portion of polymerization vessel 3 through line 5. The feed is generally from about 70 to about 99.5 mol percent monoolefin monomers. As the feed flows through zone 3 upwardly through line 17, zone 2, line 16, and zone 1, a portion of the monomer is polymerized in each polymerization zone by the action of the active polymer-catalyst particles already formed. The upflowing gases in these zones maintain the beds in zones 1, 2 and 3 in a dense fluidized state of hindered settling. Finely divided catalyst is introduced into polymerization zone 1 through line 4 and is quickly dispersed therein. The catalyst preferably has a particle size in the range 40 to 100 mesh, although finer particles can be used if desired. In zone 1, polymer particles are quickly formed on the particles of catalyst, coating the same. The polymer flows countercurrently to the direction of flow of the feed gases, overflowing from zone 1 through line 9 into zone 2 and from zone 2 through line 10 into zone 3. Polymer-catalyst particles overflow through line 18 as a product of the process. If desired, a portion of the polymer-catalyst particles flowing through line 18 can be recycled to line 4 in order to dilute the finely divided solid catalyst before it enters polymerization zone 1 for better initial catalyst dispersion. Ordinarily from about 1 to 20 pounds of recycle polymer per pound of catalyst is employed. Effluent gases flow from the top of polymerization zone 1 through line 6. These gases still contain unreacted olefins but in a decreased concentration. A small proportion of the gases are bled from the system through line 15. The rate of withdrawal through line 15 is such that the rate of withdrawal of inert gases through line 15 equals the rate of their introduction through line 5 with feed. The portions of the gases in line 6 which are not withdrawn through line 15 flow through line 6 to blower 14 which raises the pressure sufficiently to assure their entry back into the polymerization system. A portion of the gas flowing through line 6 is introduced through line 7, cooler 11 and line 16 into polymerization zone 1, another portion is introduced through line 8, cooler 12 and line 17 into polymerization zone 2, and still another portion is introduced through cooler 13 and line 5 into polymerization zone 3. These recycle gases after being cooled in the respective coolers, provide the cooling for taking up the exothermic polymerization heat in each of the polymerization zones in order that the temperature of polymerization can be held substantially constant at its optimum value in the polymerization zones. The recycle gas also importantly contributes to the fluidization of the solid in each polymerization zone. By the cooling system thus described, it is possible by regulating the amount of cooling in each of the coolers and regulating the amount of recycle gas to each of the polymerization zones to maintain a constant temperature throughout the polymerization system without the use of indirect heat exchange surfaces in contact with polymers and monomers being polymerized, thus avoiding the serious problem of fouling of the exchange surfaces which can occur when such surfaces are in contact with the polymerization reaction mixture. The problem is particularly serious when the polymerization reaction is effected within 30° or less of the melting temperature of the polymer formed, as often is the case. For some uses it is desirable to obtain a polymer having a controlled range of molecular weights. In such cases each of the polymerization zones can be held to different temperature values by adjustment of the recycle gas temperatures and quantities. For instance, the reaction temperature can be allowed to progressively decrease from the top reactor to the bottom reactor.

In a specific example of the process of the invention effected according to the process described in conjunction with the description of the figure, the catalyst employed is prepared by using as a base a silica-alumina coprecipitated composite gel containing 90 weight percent silica and 10 weight percent alumina. The gel is treated with a mixture of steam and air at an elevated temperature for several hours prior to use. The gel is thereafter impregnated with an aqueous solution of chromium trinitrate nonahydrate, dried and heated in dry air for about 5 hours at about 950° F. The final catalyst contains about 2 weight percent chromium as oxide, most of which is in the hexavalent state, as is determined by ascertaining the water-soluble chromium present by leaching with water and determining the dissolved chromium in the leachings. The final catalyst has a particle size in the range from 70 to 100 mesh. At the start of the herein described example each of the reactors 1, 2, and 3 contains previously formed polyethylene in particle form, 1.8 pounds per hour of this catalyst is charged through line 4, while 37,900 standard cubic feet per hour of ethylene of 99.5 mol percent purity is charged through line 5 into polymerization reactor 3. The inert gas in the feed is almost entirely ethane. Temperatures in each of the zones are maintained at 240° F., and pressures are maintained at 450 p.s.i.a. The composition of the effluent gas flowing from polymerization reactor 1 through line 6 is 90 mol percent ethylene and 10 mol percent inert gases. 4.5 mols of ethylene and 0.5 mol of inerts per hour are purged from the system through line 8, while 10,410,000 standard cubic feet per hour of the off gas passes through blower 14, one-third of this amount flowing through each of the coolers 11, 12, and 13, respectively, and being cooled to 230° F. before being introduced into polymerization reaction zones 1, 2, and 3, respectively. The diameter of each of the polymerization reactors 1, 2, and 3 is 7.5 feet. Polyethylene is produced at the rate of about 2660 pounds per hour through line 18. This polyethylene is a product of the process and contains less than 0.07 weight percent of catalyst.

With the small amount of catalyst in the polymer produced, the product polymer made according to the present process can for many uses be employed without removal of the catalyst, for instance, when the polymer is to be employed for the production of piping, particularly piping containing a filler such as carbon black or the like. However, the polymers of the present invention can be treated for the removal of catalyst particles by means known to the art. Methods of removal described in U.S. Patent 2,825,721, issued March 4, 1958, are applicable, for instance.

While a system having three polymerization zones has been described, two or more polymerization zones can be employed.

As will be evident to those skilled in the art, various modifications of this invention can be made or followed in the light of the foregoing disclosure and discussion without departing from the spirit or scope of the disclosure or from the scope of the claims.

I claim:

1. A process for continuously polymerizing in the vapor phase at least one olefin selected from the group consisting of ethylene and propylene in admixture with an inert diluent gas comprising passing a stream of such a gaseous mixture upwardly through a series of reaction zones, introducing a solid polymerization catalyst in finely divided form into the uppermost of said zones, said gaseous stream maintaining said catalyst in a fluidized state in said uppermost zone, thereby producing particle form solid polymer in said uppermost zone, withdrawing catalyst from said uppermost zone and subsequently passing said withdrawn catalyst in the same manner through the remainder of said reaction zones, and controlling polymerization reaction temperature in each reaction zone by cooling and recirculating portions of the off-gas from said uppermost reaction zone to each of the other of said reaction zones, said catalyst being a composition comprising chromium oxide, including a substantial amount of hexavalent chromium, associated with at least one porous solid oxide selected from the group consisting of silica, alumina, zirconia, and thoria, the said polymerization reaction temperature in each reaction zone being maintained at substantially the same temperature as each of the other said reaction zones, said temperature being in the range from 150 to 310° F. and below the melting point of the polymer being produced.

2. A process according to claim 1 wherein said stream is ethylene in admixture with inert gases and said temperature is maintained in the range from 150 to 250° F. and wherein said polyolefin is polyethylene.

3. A process according to claim 1 wherein said stream is propylene in admixture with inert gases, said temperature is in the range from 150 to 310° F., and said solid polyolefin is polypropylene.

4. A process for continuously polymerizing in the vapor phase at least one olefin selected from the group consisting of ethylene and propylene in admixture with an inert diluent gas comprising passing a stream of such a gaseous mixture upwardly through a series of reaction zones, introducing a solid polymerization catalyst in finely divided form into the uppermost of said zones, said gaseous stream maintaining said catalyst in a fluidized state in said uppermost zone, thereby producing particle form solid polymer in said uppermost zone, withdrawing catalyst from said uppermost zone and subsequently passing said withdrawn catalyst in the same manner through the remainder of said reaction zones, and controlling polymerization reaction temperature in each reaction zone by cooling and recirculating portions of the off-gas from said uppermost reaction zone to each of the other of said reaction zones to maintain each of said reaction zones at substantially the same temperature, said temperature being in the range of from 150 to 310° F. and below the melting point of the polymer being produced.

References Cited in the file of this patent

UNITED STATES PATENTS

| | | |
|---|---|---|
| 2,425,098 | Kassel | Aug. 5, 1947 |
| 2,506,221 | Keith | May 2, 1950 |
| 2,541,077 | Leffer | Feb. 13, 1951 |
| 2,692,259 | Peters | Oct. 19, 1954 |